(12) United States Patent
Stransky et al.

(10) Patent No.: US 7,664,706 B2
(45) Date of Patent: Feb. 16, 2010

(54) METHOD FOR GRANTING CUSTOMERS ACCESS TO A PRODUCT

(75) Inventors: Philippe Stransky, Marchissy (CH); Sven Engeström, Savigny (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 638 days.

(21) Appl. No.: 10/311,441

(22) PCT Filed: Jul. 6, 2001

(86) PCT No.: PCT/IB01/01211

§ 371 (c)(1),
(2), (4) Date: Dec. 17, 2002

(87) PCT Pub. No.: WO02/03696

PCT Pub. Date: Jan. 10, 2002

(65) Prior Publication Data

US 2003/0144939 A1   Jul. 31, 2003

(30) Foreign Application Priority Data

Jul. 6, 2000   (EP) ................................ 001145558

(51) Int. Cl.
G06Q 99/00 (2006.01)
H04K 1/00 (2006.01)
H04L 9/00 (2006.01)

(52) U.S. Cl. ........................ 705/51; 726/27; 380/239; 380/240

(58) Field of Classification Search .................. 705/50, 705/51, 26; 370/390
See application file for complete search history.

(56) References Cited

U.S. PATENT DOCUMENTS

| | | | |
|---|---|---|---|
| 5,577,109 A * | 11/1996 | Stimson et al. | 379/114.2 |
| 5,680,457 A | 10/1997 | Bestler et al. | |
| 6,381,747 B1 * | 4/2002 | Wonfor et al. | 725/104 |
| 6,920,567 B1 * | 7/2005 | Doherty et al. | 726/22 |
| 2001/0056463 A1 * | 12/2001 | Grady et al. | 709/203 |
| 2003/0105718 A1 * | 6/2003 | Hurtado et al. | 705/51 |
| 2003/0177095 A1 * | 9/2003 | Zorab et al. | 705/50 |

FOREIGN PATENT DOCUMENTS

| | | |
|---|---|---|
| WO | 9626605 | 8/1996 |
| WO | 9837694 | 8/1998 |

* cited by examiner

*Primary Examiner*—F. Zeender
*Assistant Examiner*—Luna Champagne
(74) *Attorney, Agent, or Firm*—Harness, Dickey & Pierce, P.L.C.

(57) ABSTRACT

Example embodiments relate to a method for granting customers access to a product or a set of products. The method may include providing by the customer through a secured communication network, a code to a registration center, wherein the code being unique, transmitting the code from the registration center to an authorization center, retrieving the identifier of the product or the set products from the code, by requesting a data base or calculating the identifier, and transmitting, by the authorization center, an authorization code to the customer terminal, wherein the authorization code allows access to the product or the set of products.

9 Claims, 1 Drawing Sheet

METHOD FOR GRANTING CUSTOMERS ACCESS TO A PRODUCT

This application is the national phase under 35 U.S.C. §371 of International Application No. PCT/IB01/01211, which has an International filing date of Jul. 6, 2001, which claims priority to EP 001145558.0, filed Jul. 6, 2000.

Example embodiments relate to a concept in which a customer, i.e. an individual or a household, wishes to use or access a product which is subject of the payment of a corresponding fee.

BACKGROUND

There is an unsatisfied need for products providers, sponsors of sports events or of artistic shows, to propose to the public at large the possibility to view at home the event that they are promoting. Currently, these operators have to use existing channels to access the viewer's homes, which can be complicated and time-consuming.

SUMMARY

Example embodiments diclose a customer, e.g., a subscriber of a PayTV system, who can easily purchase a particular event and add it to the collection of events he is entitled to watch.

DETAILED DESCRIPTION OF EXAMPLE EMBODIMENT

Figure 1:
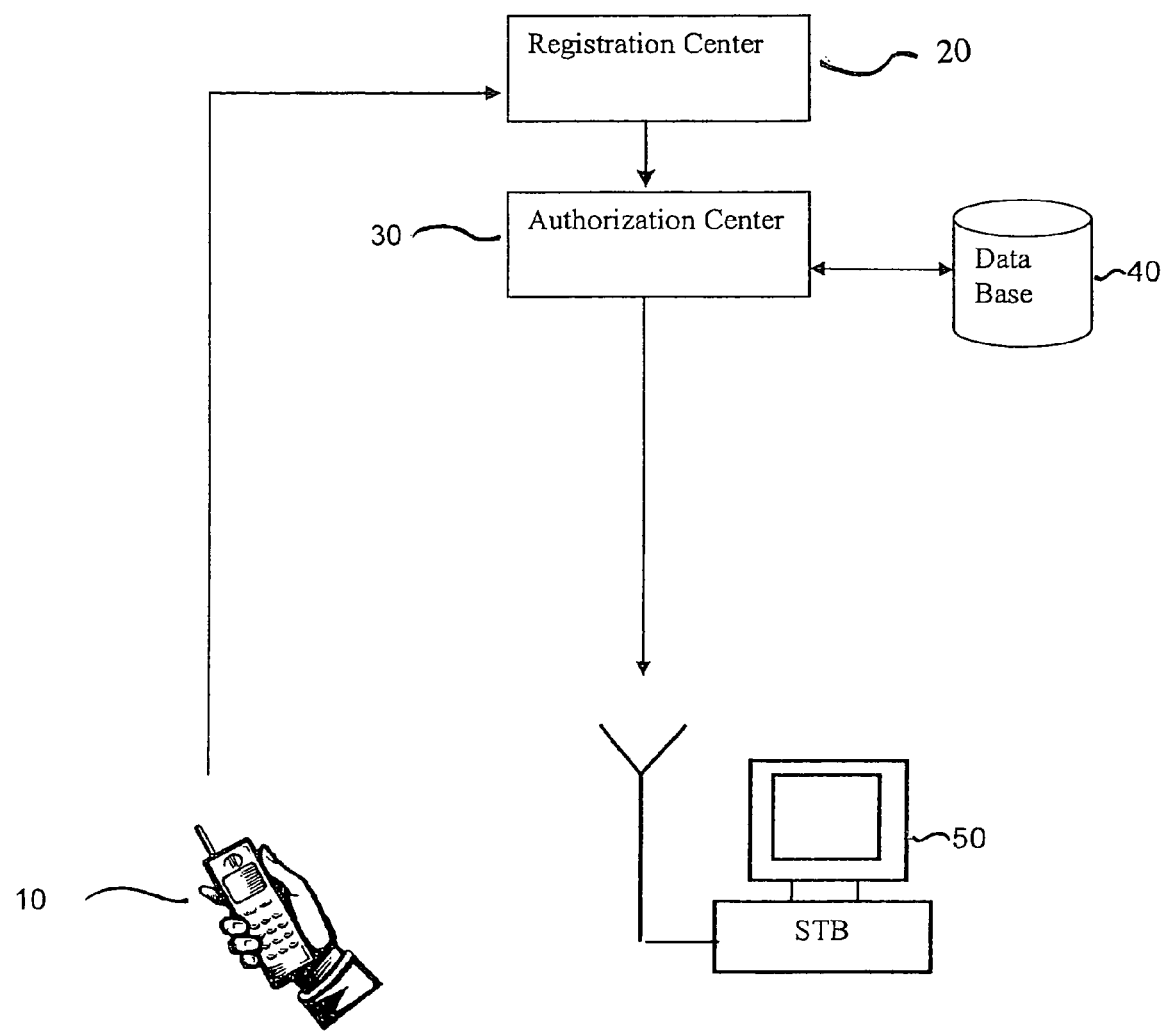
FIG. 1 illustrates a system for granting customers access to a broadcasted product according to an example embodiment.

Referring to FIG. 1, there is a single smart card per subscriber, which is the one supplied initially to the subscriber with the STB 50 or Integrated Receiver Decoder that is connected to the television set to enable the subscriber to watch the events he pays for. The advantage of this single smart card mode, as opposed to a system where the required functionality would be achieved with multiple smart cards, is that it avoids and precludes any security issues concerning pairing and data transfer between the bought cards, that would be valid for each particular supplementary event, and the main smart card. Use of multiple smart cards presents the advantage of allowing proprietary systems to work independently on the STB 50 of consumers without interacting with other systems. This can be interesting in some environments where high security is demanded.

The subscription to the basic TV package is not mandatory, viewers can use only IPPV (Impulse Pay-per-View) if they wish. The IPPV mode must be enabled for each specific subscriber in the Subscriber Management System of the Pay TV System; this can preferably be done by default.

In a particular example embodiment of the invention, the prepaid card is a paper (cardboard) or plastic card, but not a smart card, i.e. the card has no embedded chip in the paper or plastic. It carries a code number which is not visible when buying the card, but can be revealed by scratching the surface of the card. This code is unique and allows to retrieve the product associated. The card may be mechanically protected before sale by a transparent plastic package. To obtain the product, this code number must be validated in a central database.

In a first method of verification, the unique code is used to access a database which comprises the definition of the product and the unique code associated.

In a second method of verification, an algorithm is used to retrieve the product identifier form the unique code.

In both methods, a database 40 is used to store the unique code in order to avoid multiple authorization process with the same code. At the first usage, the record associated to this code is marked as used.

Additional parameters that can also be considered are an expiry date, a channel-related code allowing the operator to trace the channel through which a new customer was acquired or through which an existing customer was added to an amateurs' list, or others.

In a particular example embodiment of the invention, designed to deter dishonest users from attempting to pass on their card number to friends, a warning system displays a message on the screen of the customer terminal. In this embodiment, subsequent attempts to use the card could result in this message to the initial user requesting him to destroy the card after usage. The user is then warned that the system keeps track and control of any fraudulent attempts to re-use a particular card that he purchased or received in the context of a particular situation, and did not dispose of properly.

The unique code numbers are recorded by the manufacturer. They are entered in the server database only once safely transferred to the point of sale. The numbers can be tracked to the point of sale which allows precise marketing and geographic control of sales.

Other ways of distributing a not directly visible number can be used within the scope of the present invention. These include ways in which a printed number can be seen only if a sealed folded paper or envelope is torn open by the entitled user.

In a first example embodiment of the invention, called "credit update without return path", when the user has revealed the code, e.g. by scratching his card or tearing his envelope as mentioned before, he can call a voice server (automated phone call handling machine). The server will identify the caller, check the central database, and will send data to the SMS i.e. the Subscriber Management System. Said SMS then sends a command to the corresponding SMS gateway and finally an EMM, or Entitlement Management Message, with the credit involved. ANI (Automatic Number Identification) can be used to identify subscriber if calling from home with registered phone number, or he will be asked to enter a code uniquely his 12-digit smart card UA (Unique Address) number. This UA address usually includes a check sum for security purposes. This mode has the main advantage of being simple. However, a potential disadvantage of this mode is that in the absence of bi-directional communication, it can not be fully guaranteed that the subscriber has received his credit, which can lead to dissatisfaction. In order to reduce risk of the subscriber not receiving his credit EMM, the text displayed on the prepaid card and serving as User's instruction procedure should mention with emphasis that the first step is to make sure the Integrated Receiver Decoder is turned on and connected with the smart card inserted, and should remain so for some hours or preferably a day. This precaution allows the operator to make sure that the EMM is received by the IRD and that no dissatisfaction will be felt by a careless user who did not follow the instructions.

In the operation "without return path" that was described, it is implied that there is no direct control over the usage of the credit. This is why a second and more sophisticated embodiment of the invention is also proposed and called "credit update with return path".

In this second embodiment, the same principle as above (with a phone voice server) can be applied when a return path is available. However, instead of sending credit directly to the card, an "immediate callback request", as generally known in the art, would be sent. When the STB (Set Top Box, a synonym for Integrated Receiver Decoder) has established communication with the Conditional Access System, sometimes abbreviated as CAS, the credit is sent as a CEMM (abbreviation for Call back EMM). The advantage is that the reception of the credit can be guaranteed and registered in the CAS.

Instead of using a voice server, a specific application can be built into the STB. An additional item on the menu is then displayed and called "register credit". The user is requested to enter the card code on the remote control. The STB dials the CAS, sends the smart card UA and the prepaid card number, the credit is validated in the server and the credit is sent.

The same mechanisms as described above can be use to sell specific events (e.g. one football game) or time-limited subscriptions (e.g. 3 month of special movie channel). The EMM for the predefined product would be sent to the card.

As an example, a known soft-drink producer that sponsors Olympic games can choose, with a system according to the invention, to offer to some of its customers a free TV access to the closing ceremony of said Olympic games. The cost of this offer is minimal because it can simply consist in a number, adequately packaged on a pack of bottles of said soft drinks. The consumer just has to enter this number appropriately in his existing payTV system hardware to be entitled to watch the captivating closing ceremony, associating the image of the soft-drink producer with that gift he received just by purchasing a pack of bottles.

Similarly, the described system allows intermediate marketing agents to safely determine how many units of a promoted product was effectively sold through the corresponding Pay-per-View channel, and being compensated accordingly with error-free commission systems.

Using cards in the above-described way does not add any prominent feature as compared to classic event selling through SMS, but the generally described prepaid television service presents high advantages from a marketing or perception point of view. It opens the door to new marketing opportunities by multiplying the available channels. In particular, the card can be priced differently from the SMS/CAS product price. When the regulatory conditions allow it, prepaid cards can be bundled physically at low cost with any product, not necessarily a TV-linked product, and charged to the sponsor according to effective usage. There is a high advantage to the sponsor to acquire new segments of customership, e.g. among the young or a targeted public of buyers of some products. Finding on another product's package a free voucher for a pre-paid television service is alluring and represents high marketing value. Additionally, would-be customers can be attracted because the selected distribution channel gives them a greater sense of anonymity when buying the cards, which is an advantage for some services.

In a particular example embodiment of the invention, a particular prepaid television service object of the present invention has a subscription start time that is initiated by the consumer revealing the card or envelope number. Today's usual subscriptions have an explicit start date and a specific end date. In this embodiment, initializing the above-described process by the consumer sets the starting date of validation and the end date is calculated, the service lasting for a predefined period of time as displayed on the card.

When events are sold in this way there is a full control over the effective number of buyers. The control is obtained without the need for a return path. This is a major advantage for paying the rights to contents providers.

According to FIG. 1, products are not limited to PayTV items such as audio and video. While considering an Internet connection (or other connection media), a product could be a game, a program, data such as weather forecast or stock quotation, which is broadcasted in encrypted form. The customer is then requested to send to the authorization center 30 via a registration center 20, a unique code which entitle the use of the product.

In return, the authorization center 30, sends an authorization code which serve as a key to decrypt the product. The transmission is carried out on a secured network, i.e. the data are encrypted and decrypted according to the general security policy of this network.

The authorization code is generally stored on a smart card which contains the secret keys necessary to perform the secured transactions.

Once stored, this authorization code can be used immediately, on customer's request or according to a scheduled time.

In case that the product is not already available on the customer terminal, the customer can request the download of the product by presenting the authorization code.

Another application field of this invention is to buy transportation related services. The product represents the access to a train or an aircraft for a specific travel. The customer, using the unique code number, purchases this service and the authorization code is stored on an electronic media such as a credit card with electronic chip.

When the service is consumed, the customer produce his electronic media which check the authorization code.

A similar application is then applied in ski resort. Once the authorization code is stored on the customer terminal, a counter is attached to this code.

This counter represents the maximum number of usage or determines a period of time (e.g. a week).

The invention claimed is:

1. A method for granting customers access to a broadcasted product or a set of broadcasted products, comprising:
   obtaining by a customer, a unique broadcast product authorization code, said broadcast product authorization code, being independent of a customer terminal, being associated to the broadcasted product or set of products, and indicating that said customer has duly acquired authorization to use said broadcasted product or set of products,
   providing by the customer through a communication network, the unique broadcast product authorization code together with information identifying a customer terminal to a registration center,
   transmitting said broadcast product authorization code from the registration center to an authorization center,
   retrieving a broadcast product identifier based on said broadcast product authorization code, through a data base or calculating said broadcast product identifier, the broadcast product identifier identifying the broadcasted product or the set of products,
   transmitting, by the authorization center, a terminal code to the customer terminal, said terminal code allowing access by the customer terminal to the broadcasted product or the set of products, and
   marking said broadcast product authorization code as used in the authorization center so that further presentation of said broadcast product authorization code will be denied.

2. The method according to claim 1, wherein the product is at least one of a video product, an audio product and a data.

3. The method according to claim 2, wherein the terminal code grants access to the product immediately, on a scheduled basis or on a customer request.

4. The method according to claim 3, wherein the product is already stored in the customer terminal and the terminal code authorizes immediate or later use of the product.

5. The method according to claim 3, wherein the terminal code allows the download of the product in the customer terminal for immediate or later use of the product.

6. The method according to claim 1, wherein the product provides access to limited areas and the terminal code grants the access for a predetermined period of time to said areas.

7. The method according to claim 2, wherein the data is at least one of a program, a stock quotation and a game.

8. The method of claim 1, wherein the transmitting said product authorization code from the registration center to the authorization center is direct.

9. The method of claim 1, wherein the product authorization code was previously generated by the authorization center.

* * * * *